United States Patent
Kim et al.

(10) Patent No.: US 7,424,001 B2
(45) Date of Patent: Sep. 9, 2008

(54) DEVICE IN DISTRIBUTED WIRELESS PERSONAL AREA NETWORK AND DATA SLOT ALLOCATION METHOD

(75) Inventors: Yong-suk Kim, Daejeon (KR); Jun-haeng Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 11/247,213

(22) Filed: Oct. 12, 2005

(65) Prior Publication Data

US 2006/0077930 A1    Apr. 13, 2006

Related U.S. Application Data

(60) Provisional application No. 60/617,671, filed on Oct. 13, 2004.

(30) Foreign Application Priority Data

May 3, 2005    (KR) ...................... 10-2005-0037119

(51) Int. Cl.
*H04Q 7/24* (2006.01)
*H04L 12/26* (2006.01)
(52) U.S. Cl. ...................... 370/338; 370/336; 455/452.2
(58) Field of Classification Search ......... 370/229–230, 370/330, 336–338, 345, 347; 455/451, 452.1, 455/452.2
See application file for complete search history.

(56) References Cited

U.S. PATENT DOCUMENTS 6,072,787 A    6/2000   Hamalainen et al.
6,788,702 B1   9/2004   Garcia-Luna-Aceves et al.
2004/0156312 A1   8/2004   Salonidis et al.
2006/0250958 A1 *   11/2006   Hur et al. ..................... 370/230

FOREIGN PATENT DOCUMENTS

| EP | 0603099 | 6/1994 |
| JP | 2002-341192 A | 11/2002 |
| WO | 2004095734 | 11/2004 |
| WO | 2004114598 | 12/2004 |

OTHER PUBLICATIONS

Hiertz et al., "A new MAC Protocol for a wireless multi-hop broadband system beyond IEEE 802.11", Wireless World Research Forum, Meeting, Jul. 2003, pp. 1-6.

* cited by examiner

*Primary Examiner*—Lee Nguyen
(74) *Attorney, Agent, or Firm*—Sughrue Mion, PLLC

(57) ABSTRACT

A data slot allocation method allowing a plurality of devices in a wireless personal area network (WPAN) to satisfy the required QoS condition for the data stream transmission. The method includes allocating a specific number of data slots of a superframe to the plurality of the devices based on the QoS information; additionally allocating a certain number of data slots to a first device when the first device transmitting a data stream is allocated data slots less than a number of required data slots for the data stream transmission; and reserving the additional data slots for the first device by reducing a number of data slots to be allocated to the other devices, excluding the first device. Accordingly, the data slots can be fairly distributed to the devices.

10 Claims, 5 Drawing Sheets

DEVICE IN DISTRIBUTED WIRELESS PERSONAL AREA NETWORK AND DATA SLOT ALLOCATION METHOD

CROSS-REFERENCE TO RELATED APPLICATIONS

This application claims the benefit under 35 U.S.C. §119 (e) of U.S. Provisional Application No. 60/617,671 filed on Oct. 13, 2004 in the United States Patent and Trademark Office, and priority from Korean Patent Application No. 2005-37119 filed on May 3, 2005 in the Korean Intellectual Property Office, the entire disclosures of which are incorporated herein by reference.

BACKGROUND OF THE INVENTION

1. Field of the Invention

The present invention relates generally to a device that transmits a data stream using an allocated data slot in a distributed wireless personal area network (WPAN) and a method for the data slot allocation. More particularly, the present invention relates to a device that regulates the number of data slots to be allocated in consideration of the number of the data slots required by neighbor devices and a method for the data slot allocation.

2. Description of the Related Art

In contrast to a local area network (LAN) or a wide area network (WAN) being widely known, a personal area network (PAN) is a network owned by an individual within a range of about 10 m. Devices owned by the individual are interconnected to construct a network in order to provide convenience for the owner. A wireless personal area network (WPAN) implements an existing PAN by wireless connection.

The Institute of Electrical and Electronics Engineers, Inc. (IEEE) 802.15 Working Group developed the WPAN for short distance wireless networks to standardize and implement the PAN. The IEEE 802.15 standard has four Task Groups. More particularly, IEEE 802.15.1 standardizes the well-known Bluetooth technology, whereas IEEE 802.15.3 and IEEE 802.15.3a standardize the high rate WPAN. Additionally, IEEE 802.15.4, alias ZigBee, standardizes low rate WPAN below 250 Kbps. The communication medium is shared by every device in the WPAN. In this regard, medium access control (MAC) is required to control the media access of the devices.

The MAC for the WPAN can be designed in two types of schemes: a centralized scheme and a distributed scheme. According to the centralized MAC scheme, the individual device operates for the whole network to manage and control the MAC for every device. In contrast, the distributed MAC scheme makes every device share the responsibility to manage the MAC.

FIG. 1 is a conceptual diagram of a WPAN environment according to the distributed MAC scheme. In FIG. 1, a black dot indicates a device, and a circle drawn based on the dot indicates a transmission range of a beacon from a device. According to the distributed MAC scheme, the devices share required information in cooperation with each other for the sake of channel time reservation, synchronization, and so forth. The WPAN environment according to the distributed MAC scheme (hereinafter, referred to as a distributed WPAN) adopts a concept of timing called superframe.

FIG. 2 depicts a structure of a conventional superframe.

Referring to FIG. 2, the superframe is structured as described in the Multiband Orthogonal Frequency Division Multiplexing (OFDM) Alliance draft v0.5. The superframe consists of 256 medium access slots (MAS). The superframe is 65.536 ms in length, and the MAS are 256 μs in length. Period 'a10' indicates a beacon period including beacon slots, and 'a20' is a data period including MAS used by other devices in the network to deliver a stream (data) to another device in the network. Hereinafter, the MAS in the beacon period is referred to as a beacon slot, and a MAS in the data period is referred to as a data slot. The devices can reserve and utilize a certain number of data slots.

Information as to the superframe is broadcast in the beacon slots of the beacon period allocated to a device. Neighbor devices take advantage of the superframe information received in a next superframe. A start time of the superframe depends on the beginning of the beacon period, which is defined as a beacon period start time (BPST).

In the distributed WPAN, a conventional device is assigned a certain number of data slots from the superframe as shown in FIG. 2 to satisfy a quality of service (QoS) requirement. In detail, the device transmits QoS information element (IE) via a common control channel such a beacon slot in the superframe. The QoS IE records information pertaining to a stream index designating a data stream delivered from the device, a required QoS (RMAS) requisite for the data stream delivery, and a desired QoS (DMAS) used to optimally transmit the data stream.

If the devices communicate with each other according to a same communication protocol, the modulation process, the demodulation process, and the data compression process are the same as well. Hence, the degree of QoS is proportional to the number of MAS. In this context, the reservation or allocation of QoS can imply the reservation or allocation of a certain number of MAS. Accordingly, it is possible to transmit the QoS IE with the number of required data slots and the number of desired data slots, instead of the required QoS and the desired QoS.

Upon receiving the QoS IE, the devices in the distributed WPAN record the information contained in the QoS IE received from another device in their memory. Next, the devices calculate the number of data slots or QoS to be assigned from a next superframe based on the recorded information. As the individual device requires a different number of required data slots and a different number of desired data slots, a solution is demanded to efficiently allocate the data slots.

For example, if the devices fairly distribute the data slots based on the number of devices that transmit the QoS IE, the data slots can be allocated as below.

TABLE 1

| Stream index | RMAS | DMAS | Serviced MAS |
|---|---|---|---|
| A (DEV 1 → 2) | 20 MAS | 40 MAS | 25 MAS |
| B (DEV 1 → 2) | 15 MAS | 30 MAS | 25 MAS |
| C (DEV 3 → 1) | 40 MAS | 80 MAS | 25 MAS |
| D (DEV 4 → 3) | 20 MAS | 40 MAS | 25 MAS |

In Table 1, when data streams A, B, C, and D are delivered in a network environment including four devices in total and the total number of MAS is 100, 25 MAS is allocated to each stream transmitted from the respective devices. RMAS of the data streams A, B, and D is 20, 15, and 20, respectively. DMAS of the data streams A, B, and D is 40, 30, and 40, respectively. As 25 MAS fairly distributed is below the DMAS but over the RMAS of each data stream, the data streams A, B, and D can be transmitted. As for the data stream C from the device 3 to the device 1, the RMAS is 40 MAS but only 25 MAS are allocated. As result, it is impossible to transmit the data stream C. As described above, under the conventional distributed WPAN, the data slots are not allocated according to the desired QoS for the provided service. Therefore, the fair allocation of the data slots cannot be attained.

SUMMARY OF THE INVENTION

The present invention has been provided to solve the above-mentioned and other problems and disadvantages occurring in the conventional arrangement, and an aspect of the present invention provides a device for fairly allocating data slots by calculating the number of data slots to be assigned from a next superframe in reference to the number of data slots required by neighbor devices and efficiently utilizing the entire data slot, and a method for the data slot allocation.

To achieve the above aspects of an exemplary embodiment of the present invention, a data slot allocation method for a plurality of devices in a distributed wireless personal area network (WPAN), includes transmitting and receiving, at the plurality of the devices, quality of service (QoS) information required to transmit a data stream via a common control channel, and allocating a certain number of data slots to the plurality of the devices based on the QoS information; additionally allocating a certain number of data slots to a first device when the first device transmitting a data stream is allocated data slots less than a number of required data slots for the data stream transmission; and reserving the additional data slots for the first device by reducing a number of data slots to be allocated to the other devices, excluding the first device, at a rate.

The QoS information may contain at least one of a data stream index, a number of required data slots, and a number of desired data slots.

The data slot allocation method may further include calculating, at the other devices, QoS satisfaction degree. The other devices may reserve the additional data slots for the first device by calculating a number of data slots in proportion to the calculated QoS satisfaction degree and subtracting the calculated number from a number of data slots allocated from a current superframe.

The data slot allocation method may further include joining, at a second device, the distributed WPAN; obtaining a total number of required data slots of streams delivered over the distributed WPAN and subtracting the obtained total number from a total number of data slots; and allocating a certain number of data slots to the second device when a number of required data slots of the second devices is below the result of the subtraction.

In accordance with another aspect of the present invention, a data slot allocation method for a device in a distributed wireless personal area network (WPAN), includes receiving from neighbor devices at least one of a data stream index, a number of required data slots, and a number of desired data slots; determining whether there is a first device among the neighbor devices, the first device transmitting a stream with allocated data slots less than the number of the required data slots; and calculating a number of data slots to be allocated from a next superframe to fall below a number of data slots allocated from a current superframe when there is the first device.

The calculation of the number of the data slots allocated from the next superframe may include calculating quality of service (QoS) satisfaction degree; calculating a number of data slots in proportion to the QoS satisfaction degree; and subtracting the calculated number of the data slots from a number of data slots allocated from the current superframe.

In accordance with still another aspect of the present invention, a device operating in a distributed wireless personal area network (WPAN), includes a communication section for receiving from neighbor devices quality of service (QoS) information that contains at least one of a data stream index, a number of required data slots, and a number of desired data slots; a determination section for determining whether there is a first device among the neighbor devices, the first device allocated data slots less than the number of the required data slots; and a controller for calculating a number of data slots to be allocated from a next superframe to fall below a number of data slots allocated from a current superframe when there is the first device.

The controller may calculate QoS satisfaction degree, and calculate a number of data slots to be allocated from the next superframe by calculating a number of data slots in proportion to the calculated QoS satisfaction degree and subtracting the calculated number of the data slots from the number of the data slots allocated from the current superframe.

The communication section may receive the QoS information via a common control channel.

BRIEF DESCRIPTION OF THE DRAWINGS

These and/or other aspects of the invention will become apparent and more readily appreciated from the following description of exemplary embodiments, taken in conjunction with the accompanying drawings of which.

DETAILED DESCRIPTION OF EXEMPLARY EMBODIMENTS OF THE PRESENT INVENTION

Figure 1:
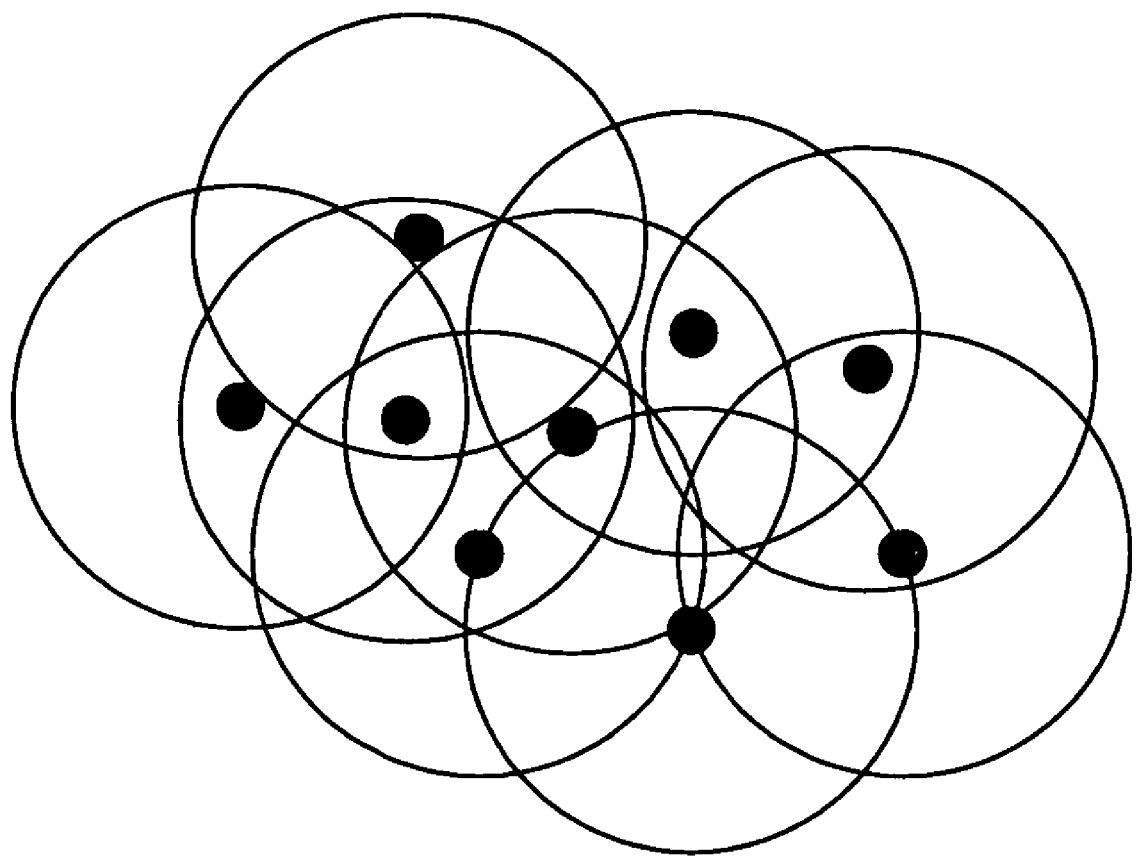
FIG. 1 is a conceptual diagram of a structure of a distributed wireless personal area network (WPAN)
Figure 2:
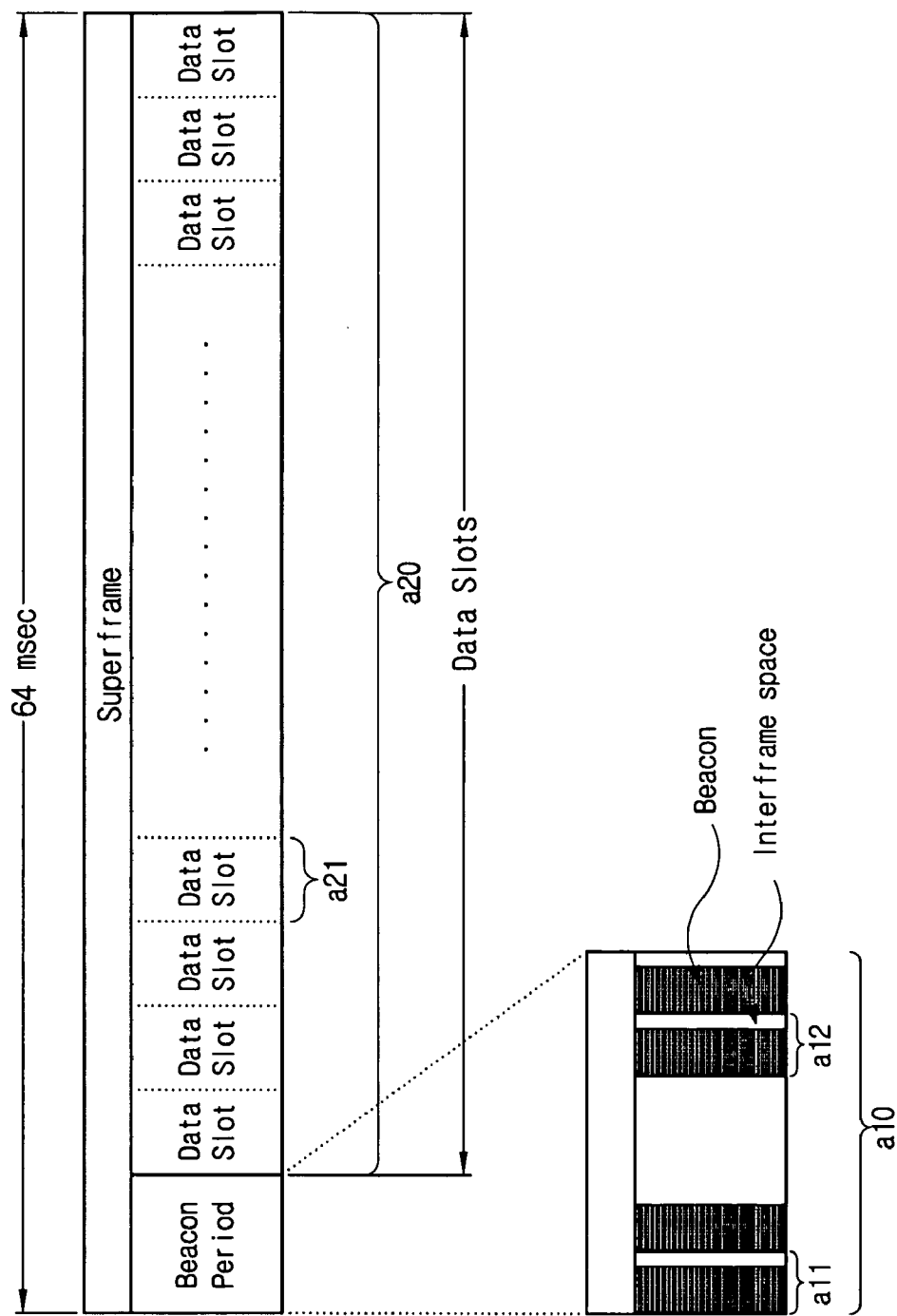
FIG. 2 is a conceptual diagram of a superframe used in the distributed WPAN.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 3:
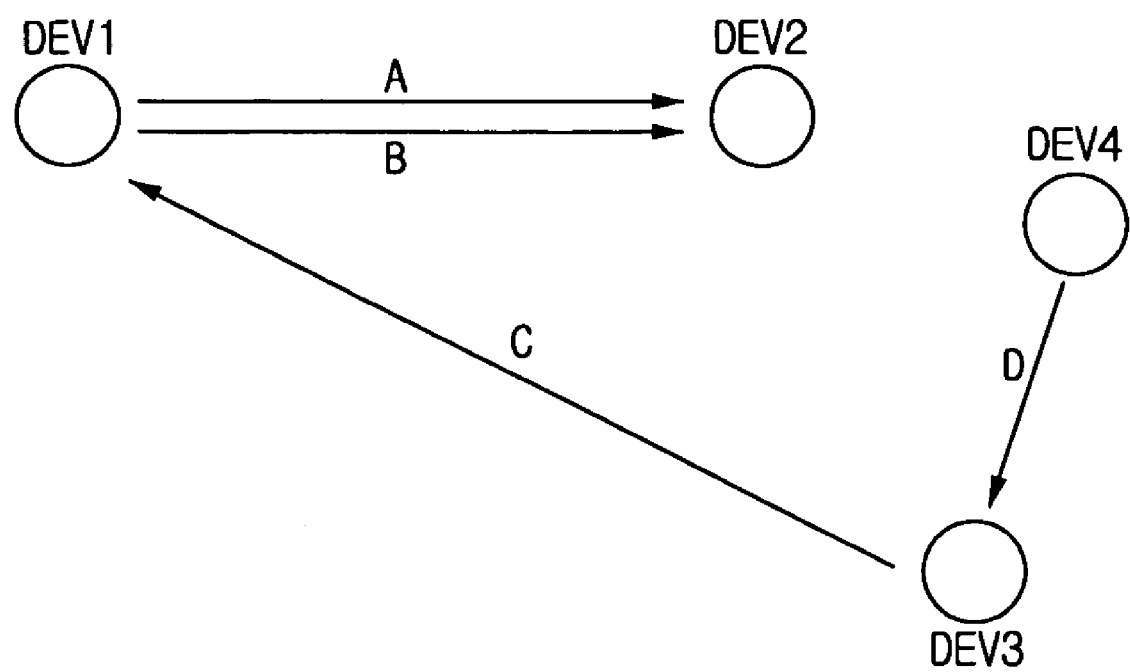
FIG. 3 is a conceptual diagram of a distributed WPAN according to an exemplary embodiment of the present invention.

FIG. 3 is a conceptual diagram illustrating how a data stream is delivered between devices in a distributed wireless personal area network (WPAN) according to an exemplary embodiment of the present invention. In FIG. 3, a device 1 (DEV1) through a device 4 (DEV4) transmit a data stream A through a data stream D. Specifically, the DEV1 transmits the data streams A and B to the DEV2, the DEV3 transmits the data stream C to the DEV1, and the DEV4 transmits the data stream D to the DEV3. The individual device is allocated a certain number of data slots in a superframe for its transmitted streams. In this situation, if all the devices are assigned the required number of data slots for the data stream transmission, a particular device may not be allocated the required data slots requisite for the data stream transmission.

According to an exemplary embodiment of the present invention, if there is a particular device without the required data slots allocated in FIG. 3, the other devices reduce their data slots to be allocated to their data streams such that the number of the allocated data slots can meet the number of the required data slots of the particular device.

To this end, the devices in FIG. 3 transmit and receive their quality of service (QoS) information via a common control channel. The QoS information pertains to information to ensure QoS of the data stream to be transmitted from the device.

In particular, the QoS information may be a data stream index designating the data stream to be transmitted, the number of required data slots required for the data stream transmission, and the number of desired data slots to optimally transmit the data stream.

Suppose that each device has the same data transmission rate in conformity with the same communication protocol, the QoS is proportional to the MAS. Hence, the QoS information can be the data stream index, the required QoS, and the desired QoS. In an exemplary embodiment of the present invention, it is assumed that each device has the same transmission rate, that is, conforms to the same communication protocol, to calculate the QoS to be allocated to the devices in proportion to the QoS information of the other devices, that is, to calculate the number of data slots. Hereinafter, the descriptions are provided based on the MAS with respect to the entire device.

For example, suppose that the data slots of a current superframe are allocated as shown in Table 1, the DEV3 cannot transmit the data stream C. To prevent this, a certain number of data slots are additionally allocated to the DEV3 to obtain the required data slots. The DEVs 1, 2, and 4 reduce their allocated data slots to obtain the additional data slots for the DEV3.

To obtain the additional data slots for the DEV3, the DEVs 1, 2, and 4 calculate satisfaction degree of their QoS ratios based on Equation 1.

$$SOQ(n) = \frac{S(n) - R(n)}{D(n) - R(n)}$$ [Equation 1]

In Equation 1, n is a superframe number, SOQ(n) is a satisfaction degree of QoS at an n-th superframe, R(n) is the number of the required data slots at the n-th superframe, D(n) is the number of the desired data slots at the n-th superframe, and S(n) is the number of the data slots allocated from the n-th superframe.

Note that the number of the additional data slots for the DEV3 is 15 MAS in Table 1. The DEVs 1, 2, and 4 calculate the number of the data slots in proportion to the calculated QoS satisfaction degree from the additional 15 MAS for the DEV3, and subtract the calculated number from the number of the allocated data slots of the current superframe.

For instance, as for the DEV1 in Table 1, its QoS satisfaction degree is (25−20)/(40−20)=¼. The multiplication of the additional 15 MAS by ¼ equals to 3.75 and is rounded up to 4. The DEV1 subtracts 4 MAS from the allocated data slots of the current superframe. That is, the DEV1 calculates the number of the data slots allocated from a next superframe to 21 MAS. The regulated number of the data slots is shown in Table 2.

TABLE 2

| Stream index | RMAS | DMAS | Serviced MAS | Allocating MAS |
|---|---|---|---|---|
| A (DEV 1 → 2) | 20 MAS | 40 MAS | 25 MAS | 21 MAS |
| B (DEV 1 → 2) | 15 MAS | 30 MAS | 25 MAS | 18 MAS |
| C (DEV 3 → 1) | 40 MAS | 80 MAS | 25 MAS | 40 MAS |
| D (DEV 4 → 3) | 20 MAS | 40 MAS | 25 MAS | 21 MAS |

To facilitate the calculation of the data slots, let the total number of the data slots be 100 in Table 2. In Table 2, the data streams A and D require 20 MAS for the transmission. Hence, the allocated 21 MAS are enough for the transmission. 18 MAS are enough for the data stream B that requires 15 MAS.

As mentioned above, 15 MAS can be additionally allocated to the data stream C by regulating the number of the allocating data slots of the next superframe with respect to the data streams A, B, and D. As a result, the DEV3 is assigned 40 MAS to meet the number of the required data slots and is able to successfully transmit the data stream C.

Figure 4:
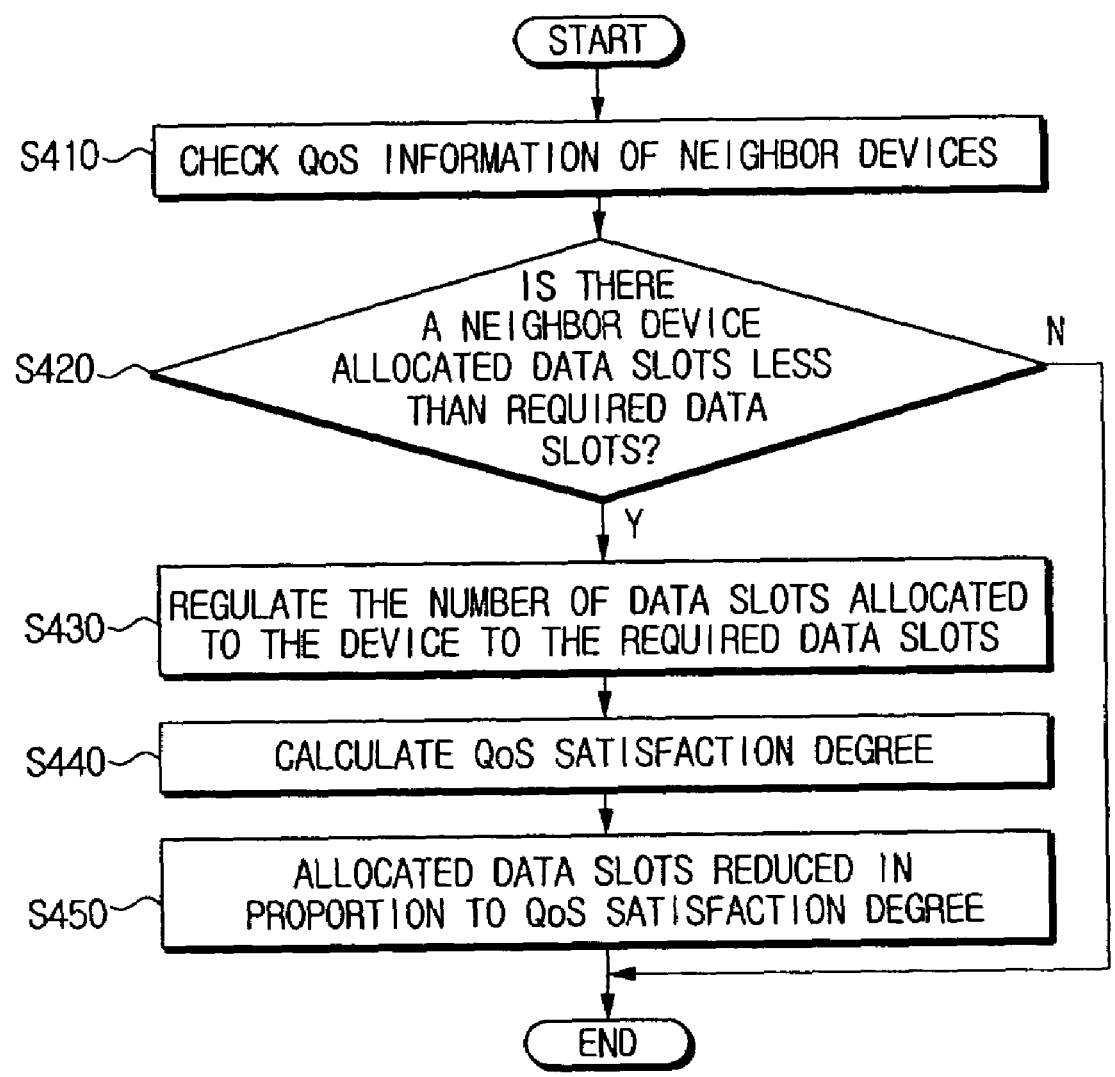
FIG. 4 is a flowchart explaining a data slot allocation method in the distributed WPAN according to an exemplary embodiment of the present invention.

FIG. 4 is a flowchart explaining a data slot allocation method in the distributed WPAN according to an exemplary embodiment of the present invention. Referring to FIG. 4, the device under the network environment checks the QoS information of the neighbor devices (S410).

The device determines whether there is a neighbor device that transmits a stream with the allocated data slots less than the required data slots (S420). If a first device is assigned the data slots less than the required data slots (i.e., the minimum data slots for use) for the transmission of a first stream, the number of the data slots to be allocated to the first device, that is, the data slots to the first stream is increased in a next superframe and the required data slots are provided (S430).

Next, the device calculates the QoS satisfaction degree by substituting the number of its required data slots, the number of its desired data slots, and the number of the data slots allocated in the current superframe into Equation 1 (S440).

The number of the data slots is reduced in proportion to the QoS satisfaction degree (S450). To reserve the additional data slots for the first stream, the other devices, excluding the first device transmitting the first stream, relinquish data slots in proportion to the calculated QoS satisfaction degree from data slots for their streams.

To this end, the devices calculate their data slots using the QoS information of the neighbor devices, which is received via the common control channel, based on a common arithmetic expression, that is, Equation 1. Therefore, the data slots of the superframe can be efficiently allocated.

Meanwhile, if a new second device attempts to access the distributed WPAN, the second device provides its data stream index, the number of the required data slots, and the number of the desired data slots in the beacon period. The access of the second device depends on whether the data slots allocated to the second device exceeds the number of the required data slots. For instance, when a value obtained by subtracting the total number of the required data slots of the entire stream currently transmitted over the distributed WPAN, from the total number of the data slots, falls below the number of the required data slots of the second device, the access of the second device fails. Hence, the second device withdraws its data slot allocation request. Conversely, if the subtraction result exceeds the number of the required data slots, the second devices attains the successful access. In this case, the individual device regulates the number of the data slots to be allocated from a next superframe to the number of its required data slots.

Figure 5:
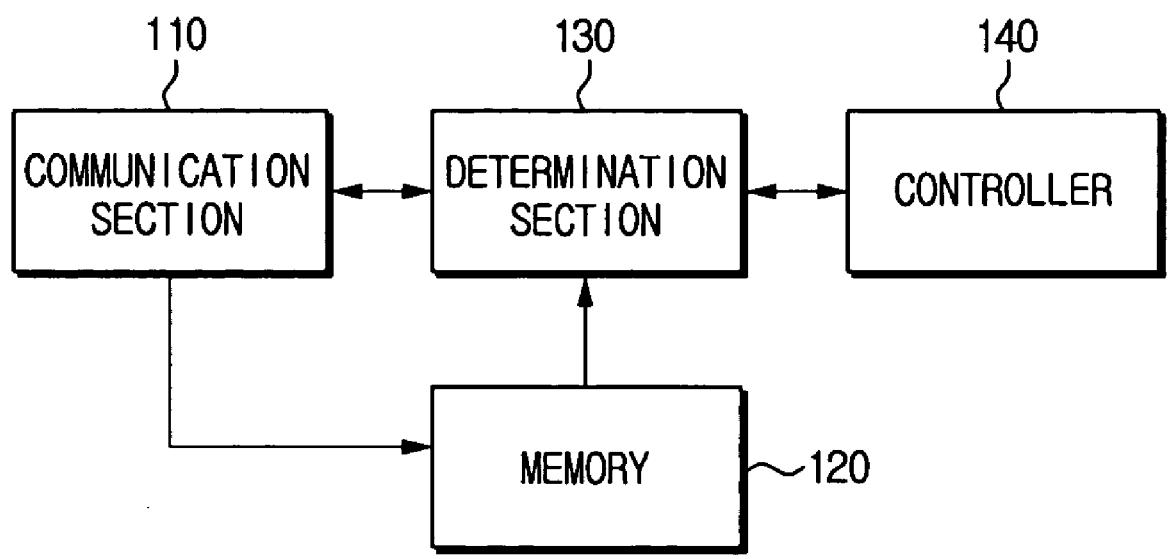
FIG. 5 is a block diagram of a device in the distributed WPAN according to an exemplary embodiment of the present invention.

FIG. 5 is a block diagram of a device according to an exemplary embodiment of the present invention. The device operates under the distributed WPAN. Referring to FIG. 5, the device includes a communication section 110, a determination section 130, a controller 140, and a memory 120.

The communication section 110 communicates with neighbor devices according to the Institute of Electrical and Electronics Engineers, Inc. (IEEE) 802.15 standard. The communication section 110 receives the QoS information from other devices via the common control channel. As for the superframe, the beacon period may be used as the common control channel.

The determination section 130, upon receiving the QoS information in the beacon period of the current superframe, determines whether there is a first device, among the devices, allocated data slots less than its required data slots for the stream transmission.

The controller 140 calculates the number of the data slots to be allocated in the next superframe according to the determination at the determination section 130. When the presence of the first device is determined at the determination section 130, the controller 140 calculates the number of the data slots allocated from the next superframe that fall below the number of the data slots allocated from the current superframe. As a result, the additional data slots are reserved for the stream transmitted by the first device so that the first device can obtain the required data slots.

The memory 120 records the QoS information received from the devices. The number of the allocated data slots in the current superframe may be recorded together. Suppose that the data slots are fairly allocated in the current superframe, the memory 120 may record the information as shown in Table 1.

Based on the information recorded in the memory 120 as shown in Table 1, the determination section 130 determines that the data stream C of the DEV3 is allocated 15 MAS below the required data slots 40 MAS.

Next, the controller 140 regulates the number of the data slots to be allocated to the data stream C from the next superframe, to 40 MAS. To reserve the additional 15 MAS (40−25=15) for the data stream C, the controller 140 calculates the number of the data slots below the number of the allocated data slots in the current superframe. In particular, if the device is the DEV1 in Table 1, the controller 140 calculates the number of the data slots allocated from the next superframe to 21 MAS. The calculated number of the data slots is allocated from the next superframe. The data slot allocation is executed through interaction with other devices according to the characteristic of the distributed network. In further detail, when the number of the data slots to be allocated from the next superframe is regulated, the controller 140 broadcasts the beacon signal, which requests the data slot allocation with the regulated number, in the beacon period to the neighbor devices and is assigned the data slots. As a result, the DEV3 in Table 1 can transmit the data stream C with as many allocated data slots as the required data slots.

In light of the foregoing as set forth above, if there is a device without the required data slots, other devices regulate their allocated data slots. Accordingly, the devices under the distributed WPAN can efficiently use the entire data slot and the fair allocation of the data slots can be realized.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A data slot allocation method for a plurality of devices in a distributed wireless personal area network (WPAN), the method comprising:

transmitting and receiving, at the plurality of the devices, quality of service (QoS) information required to transmit data streams via a common control channel, and allocating a first specific number of data slots to the plurality of the devices based on the QoS information;

checking the QoS information and additionally allocating a second specific number of data slots to a first device upon determining that the first device transmitting one of the data streams is allocated data slots less than a number of required data slots for the data stream transmission in current superframe; and reserving the additionally allocated data slots for the first device by calculating a QoS satisfaction degree using the number of required data slots and a number of desired data slots and reducing a number of data slots to be allocated to other devices in proportion to the calculated QoS satisfaction degree in next superframe.

2. The data slot allocation method of claim 1, wherein the QoS information contains at least one of a data stream index, the number of required data slots, and a number of desired data slots.

3. A data slot allocation method for a plurality of devices in a distributed wireless personal area network (WPAN), the method comprising:

transmitting and receiving, at the plurality of the devices, quality of service (QoS) information required to transmit data streams via a common control channel, and allocating a first specific number of data slots to the plurality of the devices based on the QoS information;

additionally allocating a second specific number of data slots to a first device when the first device transmitting one of the data streams is allocated data slots less than a number of required data slots for the data stream transmission; and reserving the additionally allocated data slots for the first device by reducing a number of data slots to be allocated to other devices, wherein the QoS information contains at least one of a data stream index, the number of required data slots, and a number of desired data slots, said method further comprising:

calculating, at the other devices, a QoS satisfaction degree based on an equation;

$$SOQ(n) = \frac{S(n) - R(n)}{D(n) - R(n)}$$

where n is a superframe number, SOQ(n) is a satisfaction degree of QoS at an n-th superframe, R(n) is the number of the required data slots at the n-th superframe, D(n) is the number of the desired data slots at the n-th superframe, and S(n) is a number of the data slots allocated from the n-th superframe.

4. The data slot allocation method of claim 3, wherein the other devices reserve the additionally allocated data slots for the first device by calculating the second specific number of data slots in proportion to the calculated QoS satisfaction degree and subtracting the calculated second specific number of data slots from a number of data slots allocated from a current superframe.

5. The data slot allocation method of claim 4, further comprising:
   joining, at a second device, the distributed WPAN;
   obtaining the number of required data slots of streams delivered over the distributed WPAN and subtracting the obtained number of required data slots from a total number of data slots; and
   allocating a third specific number of data slots to the second device when the number of required data slots of the second devices is less than the result of the subtraction.

6. A data slot allocation method for a device in a distributed wireless personal area network (WPAN), the method comprising:
   receiving from neighbor devices at least one of a data stream index, a number of required data slots, and a number of desired data slots;
   determining whether there is a first device among the neighbor devices, the first device transmitting a stream with allocated data slots less than the number of the required data slots; and
   calculating a number of data slots to be allocated from a next superframe that fall below a number of data slots allocated from a current superframe by calculating a QoS degree using the number of required data slots and the number of desired data slots and reducing the number of data slots to be allocated in proportion to the calculated Qos satisfaction degree when the first device is determined to exist.

7. A data slot allocation method for a device in a distributed wireless personal area network (WPAN), the method comprising:
   receiving from neighbor devices at least one of a data stream index, a number of required data slots, and a number of desired data slots;
   determining whether there is a first device among the neighbor devices, the first device transmitting a stream with allocated data slots less than the number of the required data slots; and
   calculating a number of data slots to be allocated from a next superframe that fall below a number of data slots allocated from a current superframe when the first device is determined to exist,
   wherein the calculation of the number of the data slots allocated from the next superframe comprises:
   calculating quality of service (QoS) satisfaction degree based on an equation, $$SOQ(n) = \frac{S(n) - R(n)}{D(n) - R(n)}$$

where n is a superframe number, SOQ(n) is a QoS satisfaction degree at an n-th superframe, R(n) is the number of required data slots at the n-th superframe, D(n) is the number of desired data slots at the n-th superframe, and S(n) is a number of data slots allocated from the n-th superframe;
   calculating the number of data slots allocated from the next superframe in proportion to the QoS satisfaction degree; and
   subtracting the calculated number of the data slots allocated from the next superframe from a number of data slots allocated from a current superframe.

8. A device operating in a distributed wireless personal area network (WPAN), comprising:
   a communication section which receives from neighbor devices quality of service (QoS) information that contains at least one of a data stream index, a number of required data slots, and a number of desired data slots;
   a determination section which determines whether there is a first device among the neighbor devices, the first device allocated data slots less than the number of required data slots; and
   a controller which calculates a number of data slots to be allocated from a next superframe that fall below a number of data slots allocated from a current superframe by calculating a QoS degree using the number of required data slots and the number of desired data slots and reducing the number of data slots to be allocated in proportion to the calculated Qos satisfaction degree when the first device is determined.

9. A device operating in a distributed wireless personal area network (WPAN), comprising:
   a communication section which receives from neighbor devices quality of service (QoS) information that contains at least one of a data stream index, a number of required data slots and a number of desired data slots:
   a determination section which determines whether there is a first device among the neighbor devices, the first device allocated data slots less than the number of reciuired data slots; and
   a controller which calculates a number of data slots to be allocated from a next superframe that fall below a number of data slots allocated from a current superframe when the first device is determined,
   wherein the controller calculates QoS satisfaction degree based on an equation, $$SOQ(n) = \frac{S(n) - R(n)}{D(n) - R(n)}$$

where n is a superframe number, SOQ(n) is a QoS satisfaction degree at an n-th superframe, R(n) is a number of required data slots at the n-th superframe, D(n) is a number of desired data slots at the n-th superframe, and S(n) is a number of data slots allocated from the n-th superframe,
   and the controller calculates the number of data slots to be allocated from the next superframe by calculating the number of data slots to be allocated from the next superframe in proportion to the calculated QoS satisfaction degree and subtracting the calculated number of the data slots to be allocated from the next superframe from the number of the data slots allocated from the current superframe.

10. The device of claim 9, wherein the communication section receives the QoS information via a common control channel.

* * * * *